(12) United States Patent
Osakabe et al.

(10) Patent No.: US 7,441,528 B2
(45) Date of Patent: Oct. 28, 2008

(54) OUTBOARD MOTOR

(75) Inventors: Takayuki Osakabe, Shizuoka (JP); Yoshibumi Iwata, Shizuoka (JP)

(73) Assignee: Yamaha Marine Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 11/648,355

(22) Filed: Dec. 29, 2006

(65) Prior Publication Data
US 2007/0240666 A1 Oct. 18, 2007

(30) Foreign Application Priority Data
Apr. 18, 2006 (JP) .............................. 2006-114831

(51) Int. Cl.
*F02M 35/10* (2006.01)
*F02M 35/104* (2006.01)
*F02M 35/108* (2006.01)
*F02M 35/116* (2006.01)

(52) U.S. Cl. .............................. 123/184.55; 123/184.34

(58) Field of Classification Search ............ 123/184.53, 123/184.55, 184.34, 184.42
See application file for complete search history.

(56) References Cited

U.S. PATENT DOCUMENTS

| | | | | |
|---|---|---|---|---|
| 5,048,471 A | * | 9/1991 | Takii et al. | 123/184.55 |
| 5,787,851 A | * | 8/1998 | Sakurai et al. | 123/184.55 |
| 6,718,930 B2 | * | 4/2004 | Ozeki | 123/184.55 |
| 6,736,100 B2 | | 5/2004 | Katayama | |
| 2001/0029917 A1 | * | 10/2001 | Suzuki | 123/184.55 |
| 2002/0117138 A1 | * | 8/2002 | Katayama | 123/184.55 |
| 2005/0126531 A1 | * | 6/2005 | Kunugi et al. | 123/184.31 |
| 2006/0102128 A1 | | 5/2006 | Iwata et al. | |
| 2006/0201482 A1 | * | 9/2006 | Koenneker et al. | 123/336 |

FOREIGN PATENT DOCUMENTS

JP  A-2002-195118  1/2002

* cited by examiner

*Primary Examiner*—Stephen K. Cronin
*Assistant Examiner*—Ka Chun Leung
(74) *Attorney, Agent, or Firm*—Knobbe, Martens, Olson & Bear, LLP

(57) ABSTRACT

An outboard motor mounted to a hull of a watercraft includes a V-type engine having right and left cylinder banks positioned in a cowling and having a crankshaft generally vertically disposed when the watercraft is under a running condition. A surge tank is disposed in the cowling. Right and left side long intake conduits and right and left side short intake conduits both connect the surge tank to intake ports of respective right and left banks of cylinders. The associated long intake conduits and short intake conduits can be selectively established depending on information about operational conditions of the hull and/or the outboard motor. The outboard motor includes right and left shut-off valves interchanging the long intake conduits and the short intake conduits. Right and left actuators individually actuate the right and left shut-off valves in accordance with information about operational conditions. A control means individually controls operations of the respective actuators.

19 Claims, 9 Drawing Sheets

OUTBOARD MOTOR

CROSS-REFERENCE TO RELATED APPLICATIONS

This application is based on and claims priority to Japanese patent application Serial No. 2006-114831, which was filed on Apr. 18, 2006, the entirety of which is hereby incorporated by reference.

BACKGROUND OF THE INVENTION

1. Field of the Invention

This invention relates to an outboard motor having an engine having intake conduits, more specifically, the present invention relates to an outboard with an engine in which a length of each intake conduit is variable.

2. Description of the Related Art

Outboard motors are typically mounted on a hull of a watercraft and include an engine disposed within a cowling of the motor such that a crankshaft of the engine extends generally vertically when the watercraft is under a running condition. For some engines, an effective length of each engine air intake conduit can be varied in accordance with an engine speed so as to, for example, obtain the inertia charge effect of air intake.

For example, in prior art document No. JP-A-2002-195118, respective right and left intake conduits are bifurcated so as to selectively have different effective lengths. Each such intake conduit has a valve to switch between effective conduit lengths. The respective valves are operated in accordance with information about operational conditions. The V-type engine, however, has a right bank and a left bank, and ignition times of cylinders of one bank are different from those of the other bank. Thus, the control of the effective lengths of the respective intake conduits for the cylinders of the right and left banks may be varied simultaneously and may not provide the optimum engine control suitable for the respective right and left cylinders.

SUMMARY OF THE INVENTION

Accordingly, there is a need in the art for a simple structure and method that can optimize engine performance of a V-type engine by changing effective lengths of right and left side intake conduits.

The present invention is made in view of the conventional problem discussed above, and an object of one embodiment is to provide an outboard motor that can make the optimum engine control suitable for respective right and left cylinders by individually changing effective lengths of a right and left pair of intake conduits, with a simple structure.

In accordance with one embodiment, the present invention provides an outboard motor adapted to be mounted on a hull of a watercraft. The outboard motor includes a cowling and a V-type engine generally enclosed within the cowling. The engine comprises right and left banks of cylinders, a crankshaft arranged to extend generally vertically when an attached watercraft hull is in an operating condition, a surge tank disposed within the cowling, and right and left side intake conduits for connecting the surge tank to intake ports of respective cylinders of the right and left banks. The right and left side intake conduits each have first and second openings into the surge tank. Each intake conduit has a valve for selectively closing the second opening so as to place the conduit in a long effective intake conduit condition. The conduit is in a short effective intake conduit condition when the valve is open. The engine further comprises right and left actuators for actuating valves on the right side and left side, respectively, and a controller for controlling operation of the actuators in accordance with information about engine and/or watercraft operational conditions. The controller controls the right actuator independently from the left actuator.

In accordance with another embodiment, the controller is adapted to vary a speed of valve operation depending upon operational conditions of the engine and/or watercraft. In another embodiment, a first valve operation speed is substantially slower than a second valve operation speed. In a further embodiment, the controller is adapted to control the actuators so as to change valve position in a step-by-step manner.

In yet another embodiment, the controller is adapted to selectively control the actuators so as to change valve position in a step-by-step manner or at a selected valve change speed. In still another embodiment, the controller selects the manner of valve operation based upon operational conditions of the engine and/or watercraft. In one embodiment, the controller selects the manner of valve operation based upon the engine speed.

In a further embodiment, each of the valves on the right side comprises a valve shaft coaxial with a right side shaft, each of the valves on the left side comprises a valve shaft coaxial with a left side shaft, and the right and left actuators are coaxial with the right and left shafts, respectively. In one embodiment, the controller is adapted to selectively vary actuator speed so as to control speed of valve operation. In another embodiment, a first portion of the surge tank is disposed forwardly of a crankcase of the engine, and a second portion of the surge tank is disposed on a side of the crankcase, and the second openings of the intake conduits open into the second portion of the surge tank. In yet another embodiment, the controller is adapted to control the actuators so as to change valve position in a step-by-step manner.

In accordance with another embodiment, an outboard motor adapted to be mounted on a hull of a watercraft is provided. The outboard motor includes a cowling and an engine generally enclosed within the cowling. The engine comprises a plurality of cylinders, a crankshaft arranged to extend generally vertically when an attached watercraft hull is in an operating condition, a surge tank disposed within the cowling, and intake conduits for connecting the surge tank to intake ports of respective cylinders. The intake conduits each have first and second openings into the surge tank. Each intake conduit has a valve for selectively closing the second opening so as to place the conduit in a long effective intake conduit condition, the conduit being in a short effective intake conduit condition when the valve is open. The engine further comprises a valve actuator for actuating the valves, and a controller for controlling operation of the actuator in accordance with information about engine and/or watercraft operational conditions. The controller is adapted to control the valves so as to vary the valve operation speed and/or to operate the valve in a step-by-step manner.

In another embodiment, the valves are arranged on a common valve shaft, and the actuator is coaxially mounted on the common valve shaft.

In yet another embodiment, at least part of the surge tank is disposed between the intake conduit and the crankcase, and the second opening of each intake conduit opens in a direction generally facing the crankcase. In a still further embodiment, the actuator is disposed substantially in a space between at least a portion of the intake conduit and the crankcase.

DETAILED DESCRIPTION OF PREFERRED EMBODIMENTS

The present specification is provided in the context of a preferred embodiment of an outboard motor, which preferred embodiment is not intended to limit the scope of this invention. In this embodiment, a front side of the outboard motor is positioned on a hull side of an associated watercraft, while a rear side of the outboard motor is positioned on the opposite side to the hull side.

Figure 1:
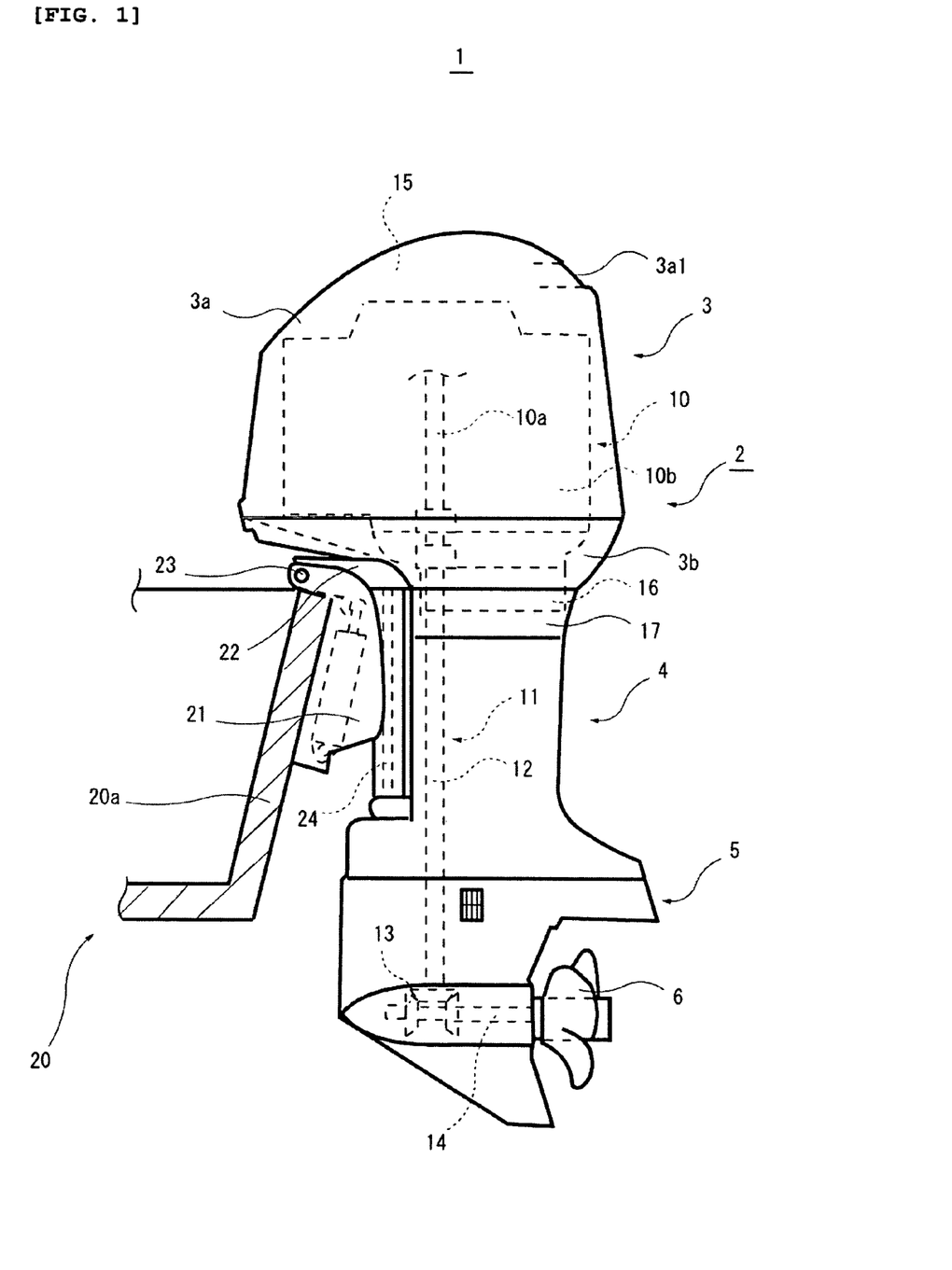
FIG. 1 is a side elevational view of an outboard motor.

With initial reference to FIG. 1, the outboard motor 1 has a propulsion unit 2 whose housing part is formed with a cowling 3, an upper casing 4 and a lower casing 5. The cowling 3 positioned atop encloses an engine 10 whose crankshaft 10a extends generally vertically, while the lower casing positioned on the bottom has a propeller 6 rotated by the power of the engine 10. In the engine 10, the crankshaft 10a is positioned closer to the hull of an associated watercraft than cylinders 10b which are located on the side of the crankshaft 10a opposite the hull. A power transmission mechanism 11, exhaust passages (not shown) and so forth extending from the engine 10 are enclosed in the upper casing 4 and the lower casing 5 to extend therethrough. The power from the engine 10 rotates the propeller 6 through the power transmission mechanism 11. The power transmission mechanism 11 includes a driveshaft 12, a mode shifting mechanism 13 and a propeller 14.

The cowling 3 defining an engine room 15 includes a top cowling member 3a and a bottom cowling member 3b. The top cowling member 3a preferably has an air intake opening 3a1 for taking air to the engine 10 at lateral sides in a rear portion thereof. Air is introduced into the engine room 15 through the air intake opening 3a1. An exhaust guide 16 is disposed at a top end of the upper casing 4. The engine 10 is fixed onto a top surface of the exhaust guide 16.

The bottom cowling member 3b preferably is fixed to a peripheral portion of the top surface of the exhaust guide 16 by bolts, while a top end of the upper casing 4 is fixed to a peripheral portion of a bottom surface of the exhaust guide 16 by bolts. An apron 17 is attached so as to surround a top portion of the upper casing 4 and the exhaust guide 16. The top cowling member 3a covering the engine 10 from top to bottom thereof approaches the bottom cowling member, which is fixed to the exhaust guide 16, from a location above the bottom cowling member 3b to be removably attached thereto and detachably coupled therewith.

The outboard motor 1 is mounted to a rear end portion of the hull 20. A clamping bracket 21 is fixed to a transom board 20a of the hull 20. A tilt shaft 23 couples a swivel bracket 22 with the clamping bracket 21 so that the clamping bracket 21 supports the swivel bracket 22 for pivotal movement about an axis of the tilt shaft 23. The swivel bracket 22 carries the propulsion unit 2 for pivotal movement about an axis of a steering shaft 24.

With reference next to FIGS. 2 to 6, the illustrated engine 10 is a four stroke, V-type, 8-cylinder engine. The outboard motor 1 is mounted to the transom board 20a for pivotal motion between a running position in which the crankshaft 10a extends vertically and a tilt up position in which the crankshaft 10a extends generally horizontally. A crankcase 31 is attached to a front mating surface of a cylinder block 30 of the engine 10, and a crankcase cover 31a is attached to the crankcase 31. Cylinder heads 32 are attached to rear mating surfaces of the cylinder block 30. A head cover 33 covers an opening of each cylinder head 32 which is defined on a cam chamber side thereof. The head covers 33 and the cylinder heads 32 of the engine 10 are directed rearward in a fore to aft direction of the hull when the watercraft is under a running condition. A flywheel 100 is disposed at a top end of the engine 10 and coupled with the crankshaft 10a.

Right and left cylinders 10b are formed in the cylinder block 30 in such a manner that axes thereof together make a V-shape and extend toward the crankshaft 10a. Each cylinder head 32 has one or more intake valve openings 32a and exhaust valve openings 32b for the respective cylinder. The respective intake valve openings 32a and the exhaust valve openings 32b communicate with combustion chambers 32d defined in the V-shaped banks.

The exhaust valve openings 32b for the respective banks are led to a space defined between the V-shaped banks through respective exhaust ports 32c to merge together into individual exhaust manifolds 34 extending in the space. Exhaust gases are discharged to the body of water below the engine through the exhaust manifolds 34.

In the illustrated embodiment, the intake valve openings 32a for the respective banks are led to lateral side walls of the respective cylinder heads 32 through respective intake ports 32e. An intake manifold 36 is connected to each outside connecting opening 32f of the respective intake port 32e. As thus arranged, a bending portion 39 is formed by each intake port 32e and each intake manifold 36 to extend generally arcuately from each intake valve opening 32a to a surge tank 200; thereby, intake passages A extending forwardly from each opening 32f are formed.

Figure 2:
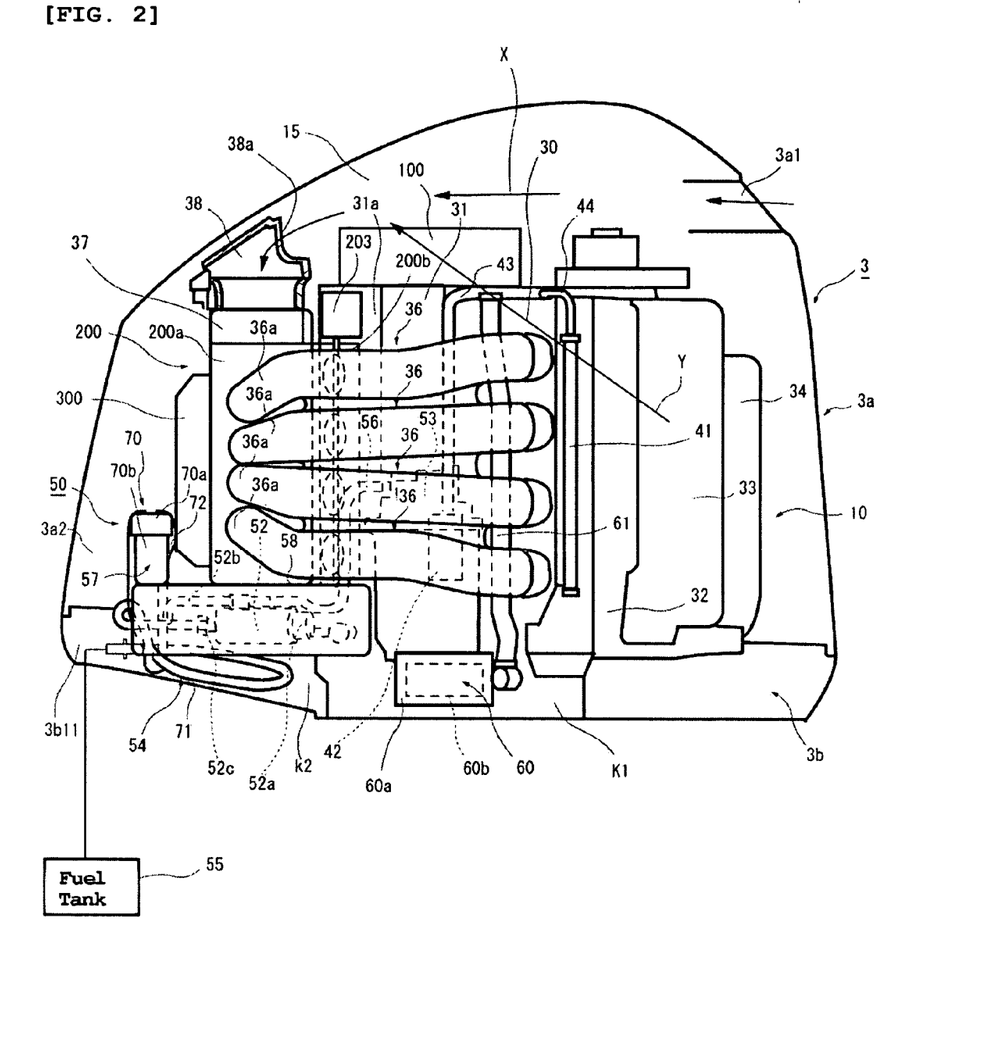
FIG. 2 is a side elevational view showing an arrangement of an engine of the outboard motor.
Figure 3:
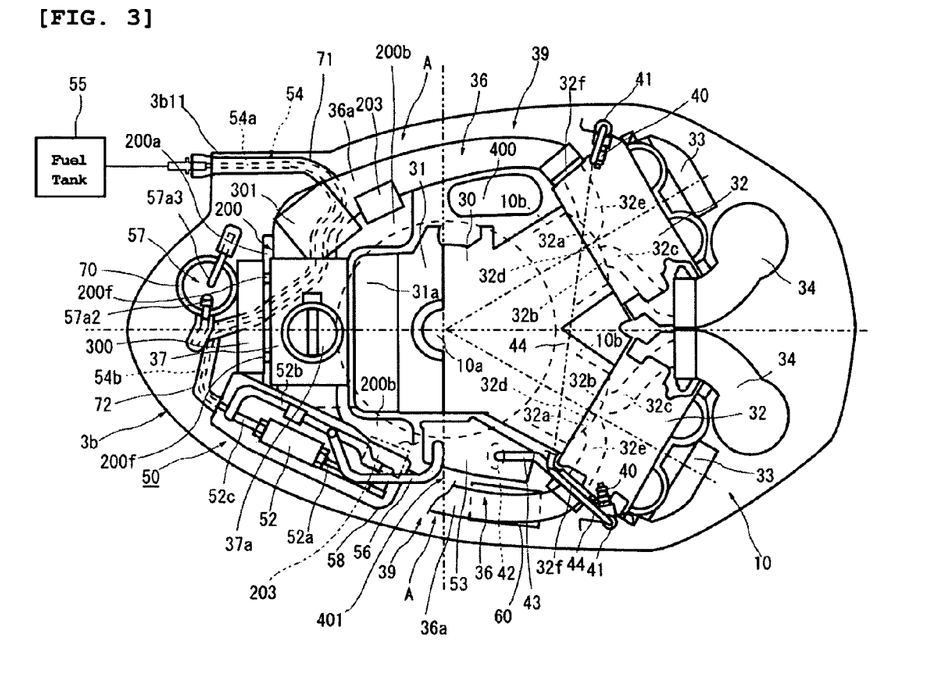
FIG. 3 is a top plan view showing the arrangement of the engine of the outboard motor.
Figure 4:
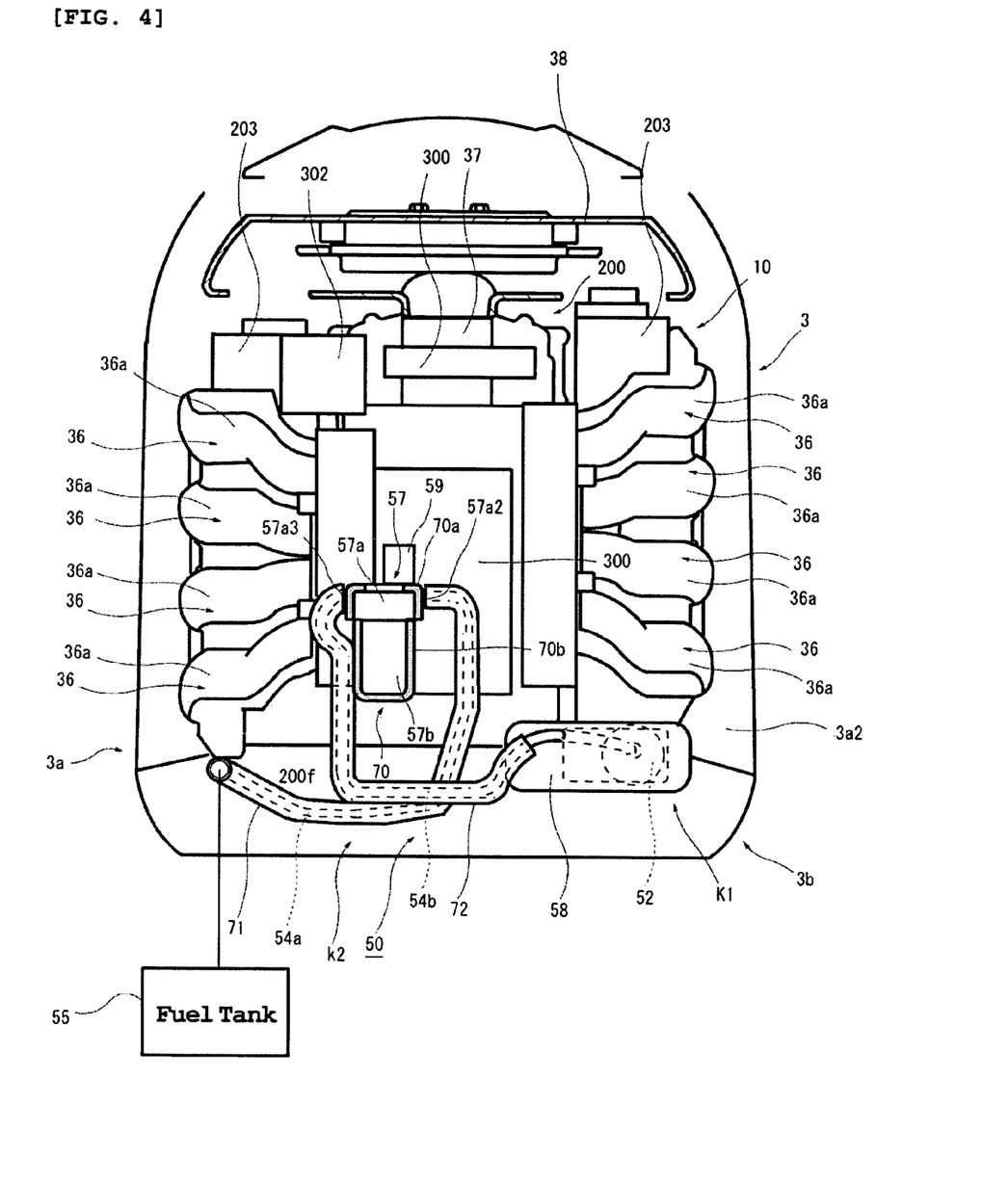
FIG. 4 is a front elevational view showing the arrangement of the engine of the outboard motor.

With particular reference to FIGS. 2-4 and 6, a throttle body 37 containing a throttle valve 37a is connected to the surge tank 200. As best shown in FIGS. 2 and 4, an intake silencer 38 is connected to an upstream portion of the throttle body 37. The intake silencer 38 preferably has a width which is generally equal to the entire width of the cowling 3. Air is taken into the intake silencer 38 through an air intake opening 38a.

Figure 5:
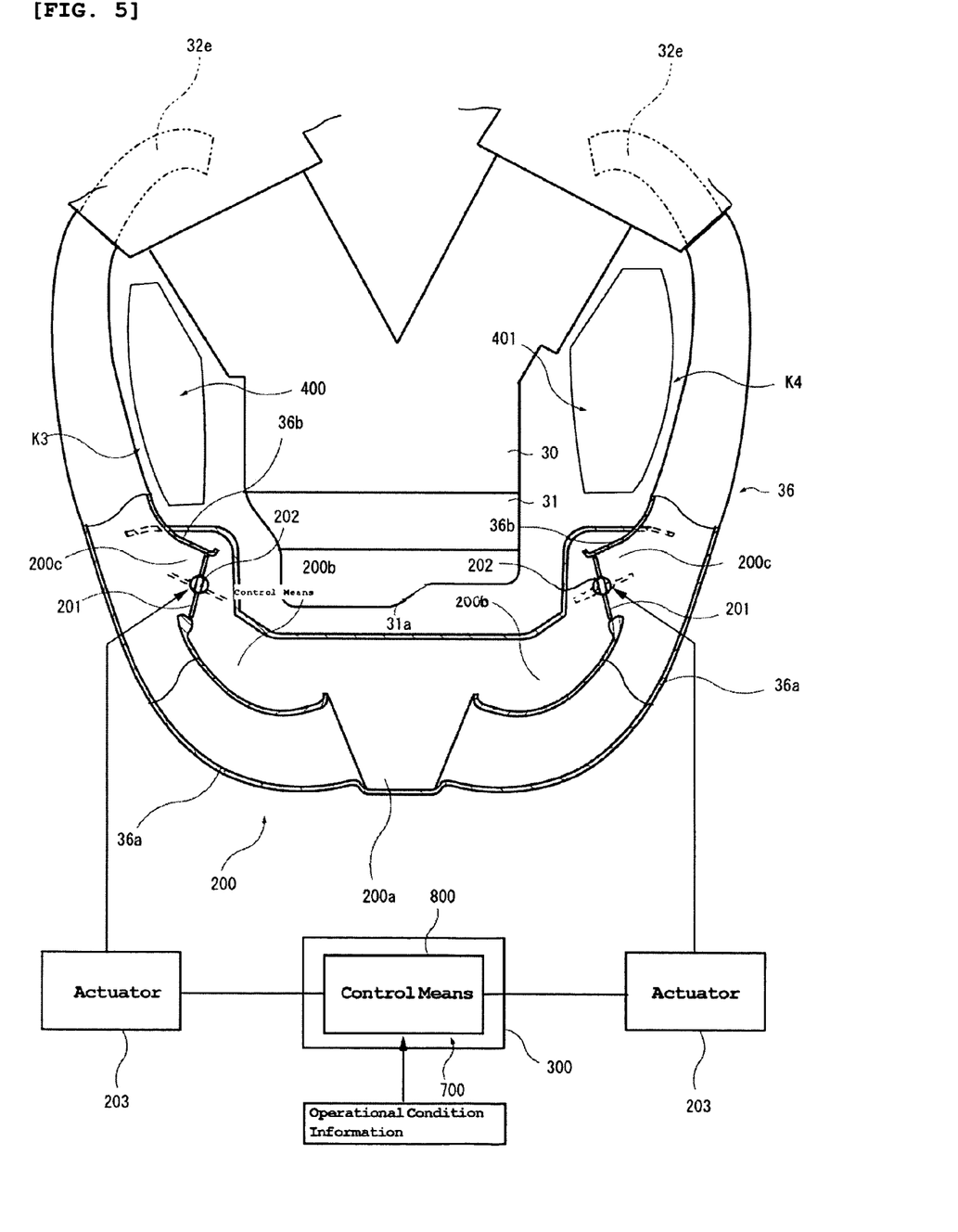
FIG. 5 is a transversely cross sectional view showing an air intake structure.
Figure 6:
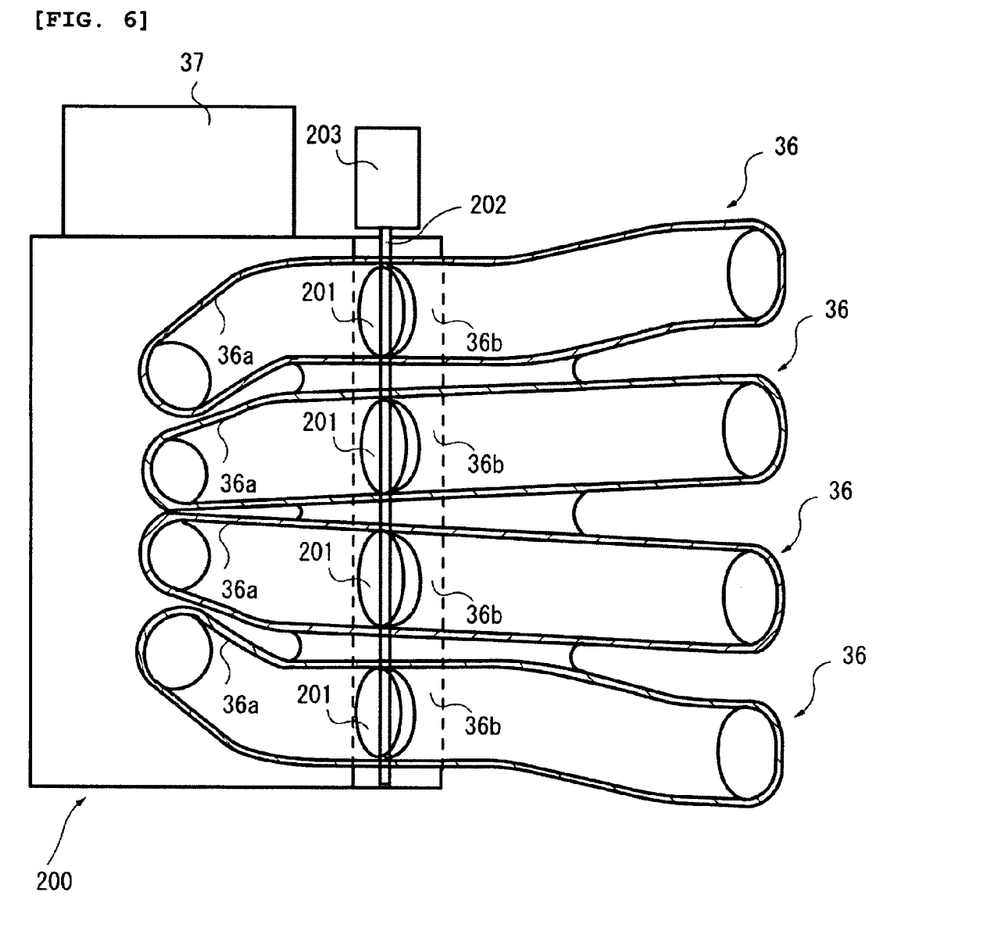
FIG. 6 is a vertically cross sectional view showing the air intake structure.

With particular reference next to FIGS. 5 and 6, an intake structure including the surge tank 200 and the intake manifolds 36 will be described. The surge tank 200 includes a first surge tank section 200a and two second surge tank sections 200b. The surge tank 200 preferably is made of aluminum and is produced by die-casting, although other materials and manufacturing methods may be employed. A vertical length of the surge tank 200 is relatively long to receive the respective intake manifolds 36 and to make an internal cavity of the surge tank 200 have a preferred capacity. The respective intake manifolds 36 connected to the surge tank 200 include long intake conduits 36a and short intake conduits 36b.

The first surge tank section 200a is disposed in front of the engine 10, i.e., on the side closer to the hull. The first surge tank section 200a communicates with the respective long intake conduits 36a. The respective long intake conduits 36a communicate with the respective intake ports 32e of the cylinders 10b on both of the banks. The intake ports 32e are positioned on outer sides of the respective cylinder rows of the V-type engine. The two second surge tank sections 200b communicate with the first surge tank section 200a. Each second surge tank section 200b is positioned at a location inside of the long intake conduits 36a, i.e., on the side of the conduits 36a closer to the engine 10, and extend rearwardly along opposite sides of the engine 10. The two second surge tank sections 200b preferably communicate with each other to ensure a larger capacity.

Because the long intake conduits 36a extend outside of the respective cylinder rows, dead spaces are created between the long intake conduits 36a and the cylinder rows or the crankcase 31. The two second surge tank sections 200b preferably extend from a location next to a crankcase cover 31a to locations next to respective lateral sides of the crankcase 31. In the illustrated embodiment, the second surge tank sections 200b extend rearwardly to points generally at center portions of the respective lateral sides of the crankcase 31. As such, the surge tank 200b takes up dead space, and a relatively high capacity is provided without the outboard motor 1 being upsized.

Each short intake conduit 36b extends into the interior of the associated second surge tank section 200b to be positioned at a location inside of a mid portion of the long intake conduit 36a, i.e., on the side closer to the engine, and communicates with the respective second surge tank section 200b through an opening 200c. A shut-off valve 201 preferably is placed at each opening 200c, to selectively open or close the particular short intake conduit 36b. The respective shut-off valves 201 preferably are attached to a valve shaft 202 extending vertically so that the valve shaft 202 links all of the valves 201. An actuator 203 is disposed at a top end of each valve shaft 202 to pivot the valve shaft 202. The respective shut-off valves 201 thus open or close the associated openings 200c. That is, each actuator 203 is positioned on the valve shaft 202 to coaxially extend with the valve shaft 202, thus minimizing the number of parts to operate the valves 201 for a plurality of conduits 36a. In addition, because direct connections between each actuator and the associated shut-off valves are practicable, the reliability of operations can be improved.

In the illustrated embodiment, the shut-off valves 201 are of butterfly type, and the valves have a common valve shaft 202 that extends generally parallel to the crankshaft 10a. Also, preferably a drive motor is used as the actuator 203 that is disposed at the top end of each actuator 203. Preferably, for example, a negative pressure diaphragm, a DC motor or a stepping motor may be used.

Although in the illustrated embodiment each actuator 203 is positioned at the top of the shut-off valves 201, the actuator 203 can be positioned at other locations, such as the bottom of the shut-off valves 201, but coaxially extending with the valve shaft. In the arrangement in which each actuator 203 is positioned at the top of the shut-off valves 201 as discussed above, the actuator 203 is positioned in a dead space surrounded by the upper-most intake manifold 36, the flywheel 100 and the top cowling member 3a. If each actuator 203 is positioned at the bottom of the shut-off valves 201, the actuator 203 also can be placed in a dead space between the lower-most intake manifold 36 and the bottom cowling member 3b. In both of the situations, the actuators 203 can be provided without enlarging the size of the cowling 3.

The engine 9 preferably has an electrical device 300 such as, for example, a controller, and an electrical accessory unit such as, for example, a relay and a fuse. As shown in FIGS. 2 and 3, the electrical device 300 preferably is attached to a center and upper portion of a front wall of the surge tank 200 to be disposed within the cowling 3. The device 300 receives detection signals from various sensors such as, for example, an engine speed sensor, a watercraft velocity sensor, a throttle valve opening degree sensor, an intake pressure sensor and oxygen ($O_2$) sensor, to control fuel injection amounts, fuel injection times and ignition times based upon the operational condition information obtained from the detection signals using various operation control maps which are installed therein. Also, the device 300 controls the actuators 203 of the shut-off valves 201 to open or close the openings 200c based upon the operational condition information and using the maps. The electrical accessory unit 301 containing relays and fuses preferably is attached to a right and upper portion of the front wall of the surge tank 200 to be disposed in the cowling 3.

As thus described, the right and left actuators 203 are individually controlled in accordance with the operational condition information to open or close the openings 200c by the respective shut-off valves 201. Thereby, for example, the shut-off valves 201 can be brought to the open positions thereof in a high speed operational range, while the valves 201 can be brought to the closed positions thereof in a low/middle speed operational range. The intake conduit length of the respective intake manifolds 36 thus can be interchanged between the length suitable for the low/middle speed operations and the other length suitable for the high speed operations. That is, the intake conduit lengths suitable for the respective operational conditions of the engine 10 can be obtained. Thereby, the inertia charge effect of air intake can be obtained in the entire operational range of the engine 10, and the targeted torque characteristic can be obtained.

The shut-off valves 201 are controlled depending on, for example, the operational range, specifically based upon an engine speed or a load, or an engine speed and a load. Further, an opening and closing speed of the respective shut-off valves 201 can be optionally decided according to the operational range.

In general, because ignition times for cylinders are different from each other, the optimum moments at which the effective lengths of the respective intake conduits are changed are different between those of the right bank and those of the left bank. As shown in FIG. 5, a controller 800 configured with the electrical device 300 controls the right and left actuators 203 in accordance with the operational condition information as shown in FIG. 5 to individually actuate the right and left shut-off valves 201 which interchange the right and left long intake conduits 36a and short intake conduits 36b. Thereby, the effective lengths of the respective intake conduits can be changed at different moments in accordance with the respective cylinders of the right and left banks. The engine control thus can be made at the optimum change moments for the respective right and left cylinders.

Figure 7:
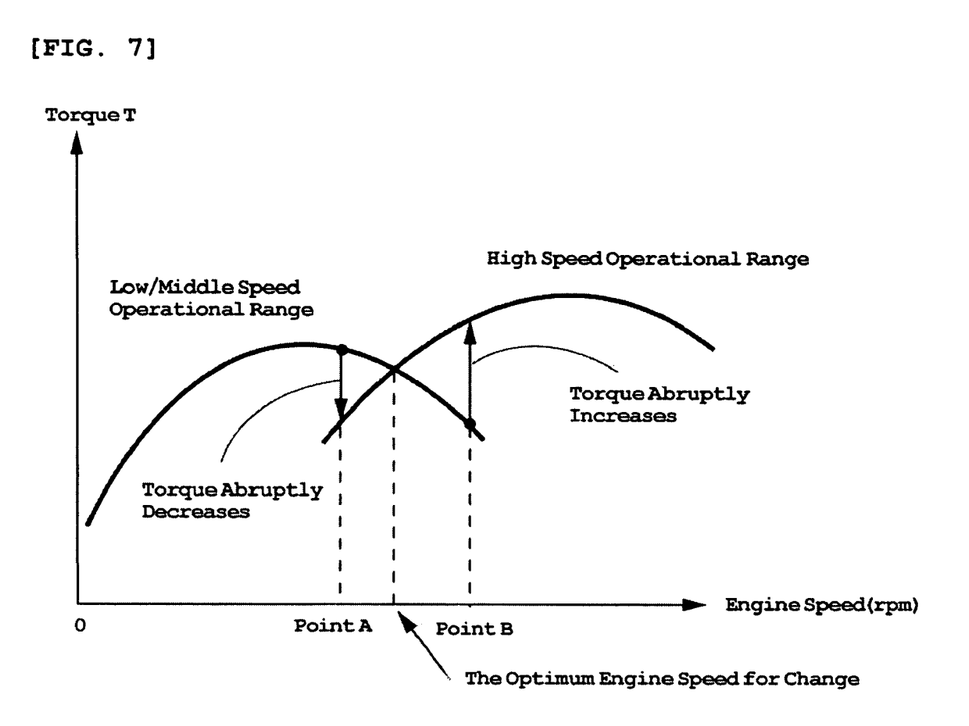
FIG. 7 is a graph showing output states of the engine depending on air intake conduit structure.

With reference next to FIG. 7, a graph shows engine torque output during low/middle engine operational speed (when the longer conduits 36a are in use, and during high engine speed operation (when the shorter conduits 36b are in use). When the effective lengths of the respective intake conduits are changed between the length for the low/middle speed operational range and the length for the high speed operational range, a change error can occur. For example, if they are changed at the engine speed A, the torque may abruptly decrease due to the excessively early change. Meanwhile, if they are changed at the engine speed B, the torque may abruptly increase to cause speed change shocks due to the excessively late change. In an outboard motor 1 that is used often at the fully open state of the throttle valves, speed change shocks can occur frequently.

Figure 8:
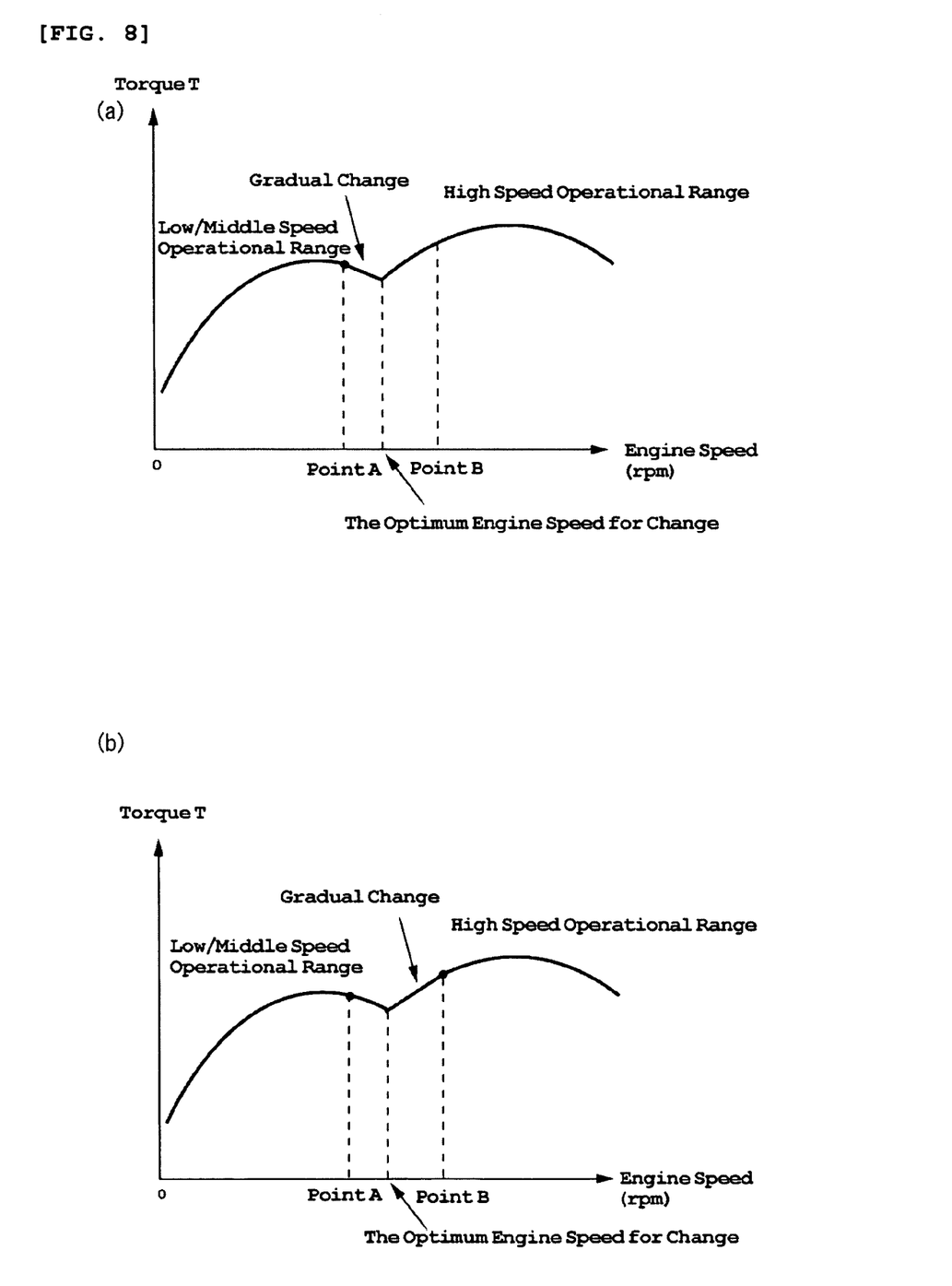
FIGS. 8 and b illustrate graphs showing states of an output of the engine in which an operational speed of the shut-off valve is slowed.

Because of these reasons, the operational speeds of the shut-off valves 201 are slowed in a preferred embodiment. That is, the valves 201 are closed slowly so that there is a significant change in engine speed between when the valves 201 start to change and when the change is complete. If, for example, the effective lengths begin to be changed at the engine speed A as shown in FIG. 8(a), the torque gradually decreases because the changes are made slowly. If, for example, the effective lengths begin to be changed at the engine speed B as shown in FIG. 8(b), the torque gradually increases because the changes are made slowly. Speed change shocks thus can be reduced.

Figure 9:
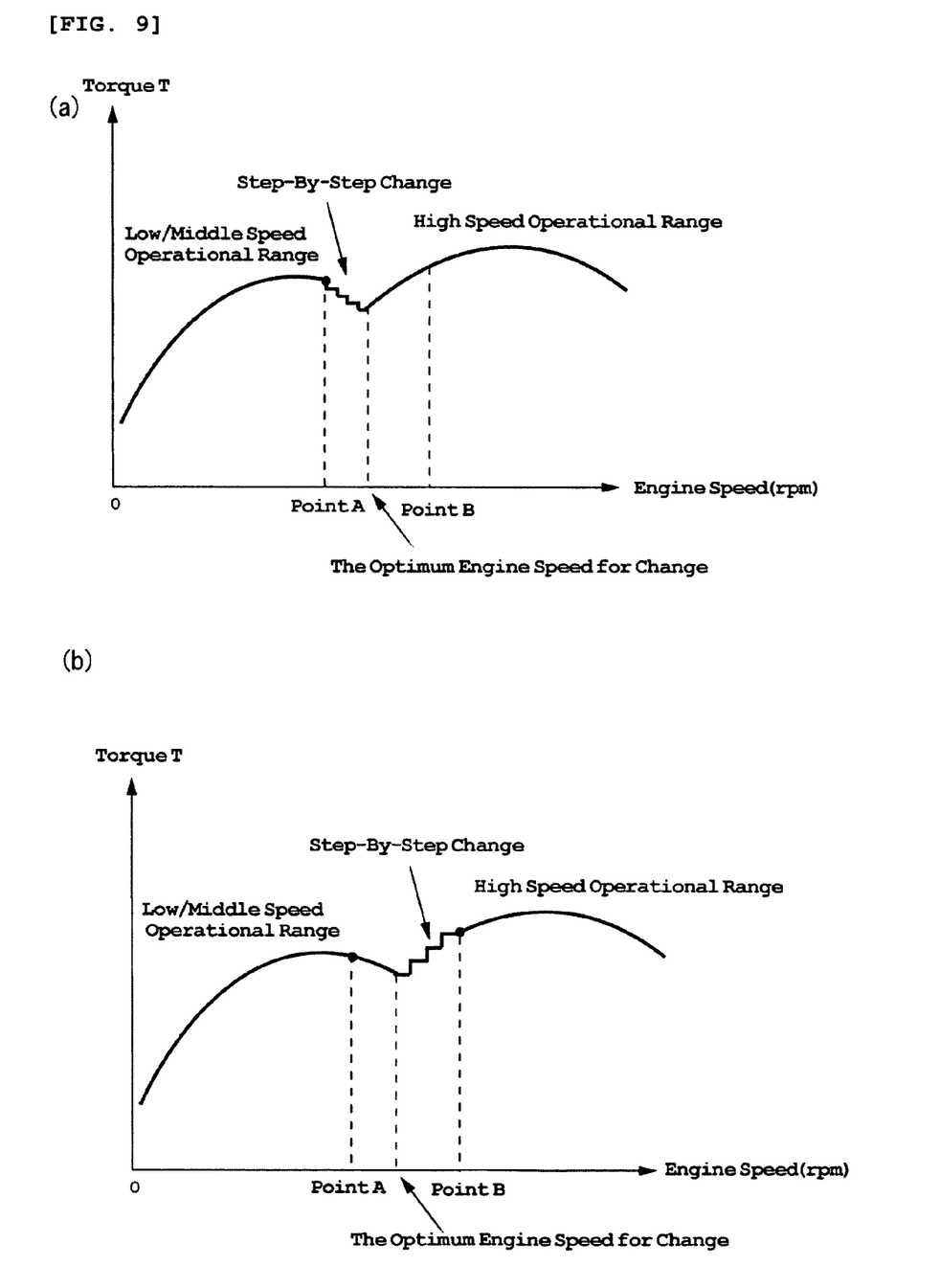
FIG. 9 illustrates graphs showing states in which a stop position of the shut-off valve is varied.

Also, as shown in FIG. 9, stop positions of the respective shut-off valves 201 are varied step by step. If, for example, the effective lengths begin to be changed at the engine speed A as shown in FIG. 9(a), the torque gradually decreases because the stop positions of the respective changes are made step by step. If, for example, the effective lengths begin to be changed at the engine speed B as shown in FIG. 9(b), the torque gradually increases because the stop positions of the respective changes are made step by step. Speed change shocks thus can be reduced.

In one embodiment, the controller 800 is capable of controlling the valves actuators so that the valves 201 are operated on a step by step or a faster/slower operation basis. Depending on engine condition information, the controller 800 determines whether to actuate the actuators 203 at a fast or slow speed, in a step by step manner, or a combination of both. In another embodiment, the controller 800 may be programmed to choose only between fast or slow actuator 203 speed. In still another embodiment, the controller 800 is programmed to choose only between fast or step by step actuator 203 operation. It is to be understood that combinations of these operational principles are also contemplated.

The right and left controls in this embodiment can be made individually in accordance with the operational condition information. Also, the operational speeds or the stop positions can be optionally selected in accordance with the operational condition information. Therefore, the accurate engine control can be made, and the shocks that occur when the shut-off valves 201 are changed can be reduced.

Because, as shown in FIG. 5, the second surge tank sections 200b are arranged to extend along the long intake conduits 36a on the side closer to the engine, the bending angle of each long intake conduit 36a can be minimized. The configuration of the first surge tank section 200a is less limited than those of the intake manifolds 36 because the first surge tank section 200a is positioned on the side closer to the hull of the watercraft. Thus, the space defined between the long intake conduits 36a and the engine 10 can be fully used to form the surge tank 200, and a distance between the surge tank 200 and the engine 10 can be quite small. Consequently, the surge tank 200 can have substantial volume without increasing the overall size of the outboard motor 1.

Because each shut-off valve 201 that opens or closes the respective short intake conduit 36b is positioned inside of the associated long intake conduit 36a, i.e., on the side closer to the engine, each actuator 203 actuating the shut-off valve 201 can be placed on the side closer to the engine 10 rather than the outside of the long intake conduit 36a in the top plan view.

Since the actuators 203 do not protrude outside, the outboard motor 1 is not upsized. Therefore, the illustrated embodiment provides a simple structure for changing the effective lengths of the intake conduits without upsizing the outboard motor 1.

As shown in FIG. 5, dead spaces K3, K4 are defined between the cylinder block 30 of the engine 10 and the right and left pairs of the long intake conduits 36a. Preferably, large sized electrical component 400 such as, for example, a starter motor or other auxiliary component is disposed in the dead space K3, while a component 401 for a fuel supply system is disposed in the dead space K4. Because the auxiliary components effectively use the dead spaces K3, K4 between the engine 10 and the long intake conduits 36a, the outboard motor 1 remains compact.

With reference again to FIGS. 2-4, in the illustrated embodiment, fuel injectors 40 are inserted into portions of the intake ports 32e of the cylinder heads 32 in the respective cylinders. An injection nozzle of each fuel injector 40 is directed to the respective combustion chamber 32d. Tubular fuel delivery rails 41 are disposed in such a manner that they are oriented toward the crankshaft 10a and positioned outside of the respective cylinder heads 32.

A fuel supply device 50 for supplying fuel to the fuel injectors 40 preferably is formed mainly as follows. A fuel filter 57, a low pressure primary pump 52 built in a sealed container 58, and a vapor separator 53 are attached to a front portion of a lateral side wall of the engine 10.

In the fuel supply device 50, the fuel contained in a fuel tank 55 mounted on the side closer to the hull is delivered to the vapor separator 53 by an operation of the low pressure primary pump 52 through a low pressure fuel delivery conduit 54a, the fuel filter 57, a low pressure fuel delivery conduit 54b and the primary pump 52. A surplus amount of the fuel discharged from an outlet port 52a of the primary pump 52 is returned to a suction port 52c of the primary pump 52 through a return passage 52b.

The fuel is delivered to a high pressure secondary pump 42 by operation of the primary pump 52 built in the vapor separator 53. The fuel pressurized by the secondary pump 42 is delivered to top ends of the right and left fuel delivery rails 41 through a high pressure fuel delivery conduit 43 and a right-left bifurcated hose 44. The fuel then is injected into each combustion chamber 32d during a period in which the injection nozzle of the respective fuel injector 40 is opened.

A canister 60 preferably is attached and fixed to the vapor separator 53. The canister 60 has a case 60a which is connected to the vapor separator 53 and filled with an absorbent 60b such as, for example, active carbon. Vapors in the vapor separator 53 enter the canister 60 and the absorbent 60b absorbs the fuel vapor. The air from which the fuel is separated by being absorbed and is discharged to the interior of the cowling 3 through a discharge pipe 61. The canister 60 is positioned below the intake manifolds 36 on the left side. As shown in FIGS. 2, 4 and 5, the vapor separator 53 and the canister 60, both of which are components of the fuel supply system, are disposed in the dead space K4 formed by the V-shaped banks on the left side of the cylinder block 30.

The fuel filter 57 preferably is positioned on a side of the crankshaft 10a opposite the cylinder heads 32 within the cowling 3 formed with the top cowling member 3a and the bottom cowling member 3b. That is, the fuel filter 57 is disposed on the side of the intake silencer 38 closer to the hull to be positioned on the side of the engine 10 closer to the hull.

The illustrated fuel filter 57 includes a body section 57a, a cap section 57b and a filter section 57c. The body section 57a is fastened up to a bracket 59. The bracket 59 is fixed to the side of the surge tank 200 closer to the hull. A female screw is formed in a recessed portion 57a4 of the body section 57a, while a male screw is formed on an attaching portion of the cap section 57b. The cap section 57b thus is detachably fixed to the body section 57a by the screwed structure. The body section 57a has an inlet port 57a2 and an outlet port 57a3. The low pressure fuel delivery conduit 54a is connected to the inlet port 57a2, while the low pressure fuel delivery conduit 54b is connected to the outlet port 57a3.

At least a heat insulator 70 covers the fuel filter 57. The insulator 70 is configured to be suitable for a shape of the fuel filter 57. The insulator 70 is formed with multiple pieces, i.e., a piece 70a for covering the body section 57a and another piece 70b for covering the cap section 57b. That is, the multiple pieces cover the entire fuel filter 57. The insulator 70 is foam rubber. The piece 70a covering the body section 57a is previously formed to fit the outer shape of the body section 57a, while the piece 70b covering the cap section 57b is previously formed to fit the outer shape of the cap section 57b.

Because the fuel filter 57 is covered with at least the heat insulator 70, the fuel filter 57 is inhibited from being heated by the engine 10 so that vaporization of the fuel can be avoided. Because the insulator 70 is configured to be suitable for the shape of the fuel filter 57, there is a generally complementary fit between the fuel filter 57 and the insulator 70, the heat insulating efficiency can be improved. Because the insulator 70 is formed with the multiple pieces covering the fuel filter 57, the piece 70a for covering the body section 57a and the piece 70b for covering the cap section 57b can be separately and easily attached to the associated sections 57a, 57b. Also, when the cap section 57b is removed from the body section 57b to be cleaned, or when the filter section 57c is exchanged for a new one, the insulator 70 is easily attached to the fuel filter 57. Thus, assembling work can be done easily, and the exchange or maintenance work can be improved.

Because the fuel filter 57 is positioned on the side of the engine 10 closer to the hull in the cowling 3, a user, a mechanic or the like can easily attach the fuel filter 57 by removing the top cowling member 3a from the bottom cowling member 3b. The assembling work can be done easily, and the exchange or maintenance work of the filter 57 can be improved.

Because the fuel filter 57 is positioned on the opposite side to the cylinder heads 32 relative to the crankshaft 10a of the engine 10 in the cowling 3, the fuel filter 57 can be spaced apart from the exhaust manifolds 34 extending from the cylinder heads 32. The fuel filter 57 thus is further inhibited from being heated by engine operation.

Also, the fuel filter 57 is positioned below the intake opening 38a of the intake silencer 38 that opens within the cowing 3. Air X flows from the air intake opening 3a1 toward the intake opening 38a of the intake silencer 38 in the engine room 15. Air Y heated by the engine 10 also flows within the engine room 15; however, the fuel filter 57 is located at the position where the air Y does not affect the fuel filter 57. Therefore, the fuel filter 57 is further inhibited from being heated by engine operation.

Other heat insulators 71, 72 cover at least a portion of the fuel delivery conduit 54 connected to the fuel filter 57, i.e., the fuel delivery conduits 54a, 54b. The fuel delivery conduit 54a extends through a right front portion 3b11 of the bottom cowling member 3b to enter the interior thereof on the right side. The fuel delivery conduit 54a turns in the vicinity of the surge tank 200 to extend below the surge tank 200 and extends upward from a location below the fuel filter 57 to be connected to the inlet port 57a2 on the left side of the fuel filter 57. The fuel delivery conduit 54b is connected to the outlet port 57a3 on the right side of the fuel filter 57 to extend downward along the fuel filter 57 on the right side of the fuel filter 57. The fuel delivery conduit 54b further extends below the fuel filter 57 to the left side to be connected to the primary pump 52 built in the sealed container 58.

As shown in FIGS. 2 and 4, the low pressure fuel delivery conduit 54a delivering the fuel contained in the fuel tank 55 mounted to the hull of the watercraft and the low pressure fuel delivery conduit 54b extending from the fuel filter 57 to the primary pump 52 are arranged using a dead space K2 defined around the fuel filter 57 and below the surge tank 200. The low pressure fuel delivery conduit 54a delivering the fuel contained in the fuel tank 55 mounted to the hull of the watercraft and the low pressure fuel delivery conduit 54b extending from the fuel filter 57 to the primary pump 52 are covered with the heat insulators 71, 72. Thus, not only the fuel filter 57 but also at least the portion of the fuel conduit 54 can inhibit the fuel from being heated. Particularly, the portion of the fuel delivery conduit 54 extending to the low pressure primary pump 52 is covered with the insulators 71, 72. The fuel delivery conduits 54a, 54b are the portion that is likely to generate vapors because of having a negative pressure by the operation of the low pressure primary pump 52. Because not only the fuel filter 57 but also the fuel delivery conduits 54a, 54b are covered with the heat insulators 71, 72, the fuel is inhibited from being heated.

The heat insulators 70, 71, 72 preferably are made of foam rubber. Notably, some water is likely to enter the interior of the cowling 3. However, even though some water may enter, the heat insulation and the durability of the insulators 70, 71, 72 can be maintained. Further, the insulators 70, 71, 72 can be produced at low costs, can be easily attached, can be easily assembled, and the exchangeability and maintenance workability thereof can be improved.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. An outboard motor adapted to be mounted on a hull of a watercraft, the outboard motor including a cowling and a V-type engine generally enclosed within the cowling, the engine comprising right and left banks of cylinders, a crankshaft arranged to extend generally vertically when an attached watercraft hull is in an operating condition, a surge tank disposed within the cowling, right and left side intake conduits for connecting the surge tank to intake ports of respective cylinders of the right and left banks, the right and left side intake conduits each having first and second openings into the surge tank, each intake conduit having a valve for selectively closing the second opening so as to place the conduit in a long effective intake conduit condition, the conduit being in a short effective intake conduit condition when the valve is open, right and left actuators for actuating valves on the right side and left side, respectively, and a controller for controlling operation of the actuators in accordance with information about engine and/or watercraft operational conditions, wherein the controller controls the right actuator independently from the left actuator.

2. An outboard motor as in claim 1, wherein each of the valves on the right side comprises a valve shaft coaxial with a right side shaft, each of the valves on the left side comprises a valve shaft coaxial with a left side shaft, and the right and left actuators are coaxial with the right and left shafts, respectively.

3. An outboard motor as in claim 2, wherein the controller controls the right and left actuators based upon operational conditions of the engine and/or watercraft.

4. An outboard motor as in claim 3, wherein the controller is adapted to selectively vary actuator speed so as to control speed of valve operation when the valve is being opened or closed.

5. An outboard motor as in claim 4, wherein a first portion of the surge tank is disposed forwardly of a crankcase of the engine, and a second portion of the surge tank is disposed on a side of the crankcase, and wherein the second openings of the intake conduits open into the second portion of the surge tank.

6. An outboard motor as in claim 3, wherein the controller is adapted to control the actuators so as to change valve position in a step-by-step manner comprising a plurality of discrete valve position changes.

7. An outboard motor as in claim 6, wherein a first portion of the surge tank is disposed forwardly of a crankcase of the engine, and a second portion of the surge tank is disposed on a side of the crankcase, and wherein the second openings of the intake conduits open into the second portion of the surge tank.

8. An outboard motor as in claim 1, wherein the controller is adapted to vary a speed of valve operation during valve opening or closure depending upon operational conditions of the engine and/or watercraft.

9. An outboard motor as in claim 8, wherein a first valve operation speed is greater than zero but substantially slower than a second valve operation speed.

10. An outboard motor as in claim 1, wherein the controller is adapted to selectively control the actuators so as to change valve position in a step-by-step manner between a plurality of discrete valve positions or at a selected valve change speed.

11. An outboard motor as in claim 10, wherein the controller selects the manner of valve operation based upon operational conditions of the engine and/or watercraft.

12. An outboard motor as in claim 11, wherein the controller selects the manner of valve operation based upon the engine speed.

13. An outboard motor as in claim 1, wherein the controller is adapted to control the actuators so as to change valve position in a step-by-step manner between a plurality of discrete valve positions.

14. An outboard motor as in claim 1, wherein the controller is configured to control the right actuator to actuate the valves on the right side at a right cylinder optimum change moment, and to actuate the valves on the left side at a left cylinder optimum change moment, and wherein the right cylinder optimum change moment is different than the left cylinder optimum change moment.

15. An outboard motor adapted to be mounted on a hull of a watercraft, the outboard motor including a cowling and an engine generally enclosed within the cowling, the engine comprising a plurality of cylinders, a crankshaft arranged to extend generally vertically when an attached watercraft hull is in an operating condition, a surge tank disposed within the cowling, intake conduits for connecting the surge tank to intake ports of respective cylinders, the intake conduits each having first and second openings into the surge tank, each intake conduit having a valve for selectively closing the second opening so as to place the conduit in a long effective intake conduit condition, the conduit being in a short effective intake conduit condition when the valve is open, a valve actuator for actuating the valves, and a controller for controlling operation of the actuator in accordance with information about engine and/or watercraft operational conditions, wherein the controller is adapted to control the valves so as to vary the valve operation speed during opening and/or closure of the valve and/or to operate the valve in a step-by-step manner in which the valve is moved step-by-step through a plurality of discrete valve positions.

16. An outboard motor as in claim 15, wherein the valves are arranged on a common valve shaft, and the actuator is coaxially mounted on the common valve shaft.

17. An outboard motor as in claim 16, wherein the controller controls actuation of the valves based upon engine speed.

18. An outboard motor as in claim 16, wherein at least part of the surge tank is disposed between the intake conduit and the crankcase, and the second opening of each intake conduit opens in a direction generally facing the crankcase.

19. An outboard motor as in claim 18, wherein the actuator is disposed substantially in a space between at least a portion of the intake conduit and the crankcase.

* * * * *